2,782,116
Patented Feb. 19, 1957

2,782,116
METHOD OF PREPARING METALS FROM THEIR HALIDES

Frank H. Spedding and Harley A. Wilhelm, Ames, Iowa, and Wayne H. Keller, St. Louis, Mo., assignors to the United States of America as represented by the United States Atomic Energy Commission No Drawing. Application September 6, 1946, Serial No. 695,299

1 Claim. (Cl. 75—84.1)

This application relates to the production of refractory metals from metal halides. The invention is especially concerned with the production of thorium and similar metals of group IV–A of the periodic system including titanium, zirconium and hafnium.

The production of thorium by reaction of the oxide, chloride or other compound of the desired metal with sodium metal has been proposed. However, it has been found that such processes result in the production of the metal in a finely divided or pulverulent state, frequently in low yield, and in most cases the metal produced, whether in massive form or powdered state, has been contaminated with numerous impurities, particularly with the oxide of the metal undergoing preparation.

The present invention provides a novel process whereby the metals herein contemplated may be produced, usually in massive form (as relatively large aggregates), and substantially free from contamination by undesirable impurities, particularly the oxide of the metal to be produced. In performance of this process a reducing metal of the group consisting of alkali metals, and alkaline earth metals such as sodium, potassium, lithium, calcium, barium, strontium, or magnesium (usually in amounts of 5 to 10 percent or more in excess of the theoretical quantity required), is reacted with a fluoride of the metal to be prepared. We have found that such a process should be conducted at a temperature above the melting point of the metal being prepared or at least at a temperature sufficiently high to form a molten metal phase and to maintain the resulting reaction mass in the molten state for a time sufficient to permit separation of a molten pool of metal from the resulting slag which comprises a fluoride of the reducing metal. This pool of molten metal may be withdrawn while the metal remains in the molten state, or the pool may be allowed to solidify and may be separated from the slag thereafter. Calcium and magnesium and similar alkaline earth metals are especially useful as reducing metals in this process.

Particularly advantageous results may be secured if the reaction is conducted in an elongated reactor of such length that the resulting molten pool of metal will have a minimum surface area whereby to minimize loss of heat and premature solidification of the metal. Moreover, it is found especially advantageous to utilize a reactor which is provided with a refractory lining or interior surface comprising a refractory compound, preferably an oxide, of a metal above the metal undergoing reduction in the electro-motive series which is preferably less volatile than the metal being produced. Alkaline earth metal oxides are particularly valuable for this purpose. Further details of construction of a type of reactor which has been found advantageous will be supplied hereinafter.

The development of sufficient heat in the reaction mixture to establish the reaction temperature and to maintain the reaction mass in the molten state until separation of the phases into layers has been secured, is important since, if the temperature is not high enough, the reaction will be incomplete and recovery of metal will be poor.

With certain fluorides of metals which melt at lower temperatures and certain reducing metals, such as calcium, sufficient heat may be developed by the exothermic reaction to effect this desired result provided proper precautions are made to prevent heat loss through the walls of the reactor and also provided that sufficient reaction mixture is used in the reactor. On the other hand, special precautions must be resorted to in order to establish and maintain the required temperature for production of the refractory type metals herein desired to be produced since these metals melt at temperatures not less than 1600–1800° C.

In accordance with this invention it has been found that all or a substantial portion of the necessary heat required to ensure layer separation may be developed internally by conducting an auxiliary exothermic reaction involving co-reduction of another metal halide in the reaction mixture of the refractory metal fluoride and the reducing metal. This auxiliary reaction should be thermodynamically capable of developing a temperature higher than can be developed by the reaction of the reducing metal with the refractory metal fluoride. For example, an additional halide of another metal which is below the reducing metal, and usually below, or more electronegative than, the refractory metal being produced in the electromotive series (as printed, for instance, in the Handbook of Chemistry and Physics, 26th edition, p. 1360, published 1942 by Chemical Rubber Publishing Co.), may be added to the reaction mixture, and the amount of reducing metal (calcium, magnesium, sodium etc.) then is increased accordingly. By this process the heat evolved from the auxiliary reaction aids in the establishment of the temperature required, and/or the presence of auxiliary reactants or reaction products lowers the melting point of the metal and/or slag so that the layer separation may be secured. An additional advantage is secured through the use of a halide of a metal which melts at a lower temperature than the refractory metal or at least of a metal which alloys with the refractory metal to form an alloy having a melting point lower than that of the refractory metal itself. In this case the melting point of the resulting metal phase may be substantially lowered and the process may be conducted at a lower temperature and with less heat input. A particularly advantageous result may be obtained by a reduction of a mixture of the refractory metal fluoride and a chloride of the other metal since in such a case heat is added to the reaction and, in addition, the viscosity of the resulting chloride-fluoride slag and/or the melting point thereof is sufficiently low to permit very efficient separation of metal therefrom, and consequently the resulting metal is secured in high yield and good purity.

Halides of various metals which are below the refractory metal in the electromotive series may be co-reduced with the refractory metal halide by this process. The process may be particularly advantageously carried out by using a halide of a metal which will be readily separable from the refractory metal to be produced. For example, metals such as zinc, cadmium, arsenic, manganese, lead, mercury, bismuth and other metals of a low boiling point may be distilled from refractory metals, such as thorium, thus permitting the production of these metals in high purity. These metals as well as others, including tin, frequently produce a metal mixture which melts below the melting point of the refractory metal, for example thorium, and thereby permit the process to be carried out at a lower temperature. Other halides of metals of groups II–B, III–B, IV–B and V–B may be reduced with halides of the above-mentioned A-group metals.

This process is also advantageous where alloys of the refractory metal with the B-group, or other, metals are to be produced. For example, thorium-beryllium, thorium-aluminum, thorium-zinc, etc. alloys may be produced in this manner. The relative proportions of refractory metals to other metal may be adjusted within comparatively wide limits in accordance with results desired. Where the metal the halide of which is co-reduced with that of the refractory metal is extremely light, as in the case of beryllium, the quantity of the other metal halide used should be balanced if possible so as to avoid the production of a metallic mixture having approximately the same density as the slag.

In conducting the reaction, we have found that it is desirable to establish a superatmospheric pressure upon the reaction mixture while the reaction is proceeding in order to maintain the reducing metal more or less uniformly dispersed throughout the reaction mass and thereby to ensure production of the resulting refractory metal in a comparatively high yield. Where metal of high purity is desired the pressure may be released after substantial reaction has occurred, and many of the impurities may be distilled from the molten metal. Alternatively, the molten metal may be allowed to be solidified and subsequently may be remelted, and impurities then may be distilled therefrom.

The reaction may be conducted in a metallic reactor usually constructed of iron or steel which is preferably lined with a resistant refractory of an alkaline metal oxide or a mixture of such oxides. The problem of securing a satisfactory lining is of paramount importance. The metals produced as herein contemplated in general alloy readily with iron or steel. Should the lining become defective during the operation, metallic thorium or similar metal flows through the defect to the metal wall of the reactor, and may penetrate the wall thus creating an exceedingly hazardous condition due to the fact that the molten metal flowing through the opening created in the wall reacts violently with the air.

The problem of securing suitable linings for bombs or other reactors used in this process has been rather complex. Silicates have been found to be unsuitable because the reducing metals tend to react therewith and the reduction product formed thereby tends to contaminate the metal produced. Applicants have found alkaline earth metal oxides, such as oxides of calcium or magnesium, to be highly effective lining materials.

The lining may be deposited upon the walls of the reactor by any convenient means. In accordance with one process described in a co-pending application of Harley A. Wilhelm, Serial No. 567,284, filed December 8, 1944, an elongated cylindrical bomb provided with a centrally disposed mandrel of the size required for the reaction zone is filled with finely powdered anhydrous magnesium oxide, dolomitic oxide, calcium oxide or similar oxide, and the bomb is subjected to a rapid jolting action whereby the powder becomes compacted into an inherent well-bonded lining. Thereupon the mandrel is removed and the bomb is ready for use. Details on the construction of the reactor suitable for the process of our invention are fully described and illustrated in said application of Harley A. Wilhelm, Serial No. 567,284.

As previously noted, the process may be effectively conducted in an elongated reactor having a length at least three times its width or diameter, since the use of such a reactor permits ready establishment of slag-separated metal pool of minimum surface area. A cylindrical pipe or shell provided with closed top and bottom ends is suitable. These closed ends may be sealed if desired. In general, where a highly volatile reducing metal, such as magnesium or sodium, is used, it is found preferable to mount the top or covering end upon the cylinder in a manner such that a minor amount of leakage of gas can take place and the pressure in the reactor during the reaction does not become excessive, being in such a case below the autogenous pressure of the system, rarely above a few hundred pounds per square inch and frequently below about 100 pounds per square inch. The amount of leakage permitted however should not be so great as to prevent establishment of a superatmospheric pressure within the reactor by the reactants. A flange cover fitted to the top end of the reactor without a gasket provides a sufficiently loose fit.

The reactants should be anhydrous and substantially free from oxygen. The reactants should be thoroughly mixed prior to introduction and in order to secure satisfactory mixing the reducing metal should be finely divided (generally about minus 10 to minus 50 mesh). In most cases the fluoride undergoing reduction may be much finer usually being largely minus 100 mesh in particle size. Sufficient reaction mixture is used to substantially fill the reactor.

Following addition of the reaction mixture to the lined reactor a cover of the lining material is provided and the reactor is closed. The reaction is initiated by preheating until the reaction mixture or a portion of it or one or more of the components thereof has been heated to the temperature at which reaction will take place (about 400–600° C. or higher), or where preheating is unnecessary the reaction may be initiated by means of an electrical fuse. This fuse may comprise a short length of resistance wire attached to a suitable source of electrical power and functions by heating a localized portion of the mixture to the temperature at which reaction initiates.

After reaction has been initiated substantial pressure develops within the system due to vaporization of the reducing metal or halide and to the fact that escape of the metal or vaporized halide is prevented or substantially minimized. The pressure developed in general exceeds ½ to 3 atmospheres gauge and in some cases is of the order of 75 to 100 pounds or higher per square inch gauge and serves to maintain the reducing metal more or less uniformly dispersed throughout the reaction mixture as the reaction proceeds. This facilitates substantially complete reaction of the halide salts and also tends to prevent reversal of the reaction at the elevated temperature due to back reaction of the resulting metal with the slag or the calcium oxide or other oxide of the liner. Moreover the pressure prevents or minimizes inleakage of air or moisture into the reactor.

When a bomb or reactor of elongated construction as herein described is used, particularly advantageous results accrue due to the fact that the reaction may be initiated in one end of the bomb by heating or otherwise and that thereby a temperature differential may be established in which one end is above the boiling point of the reducing metal and the other end of the reactor is below the boiling point of the metal phase produced and frequently at a temperature several hundred degrees below that of the opposed end. This is found to be advantageous since it effectively minimizes establishment of excessive pressures in the reactor. Furthermore, distillation of the reducing metal from the molten mass takes place progressively upwardly, and this metal condenses in the cooler end of the bomb. Thus the temperature differential permits substantial purification of the metal by removal of reducing metal, halides and other impurities before it is cooled to the solid state.

After the reaction is completed, the molten mass is maintained in the molten state until the metal has substantially completely separated from the slag. Usually this requires one of several minutes. Thereafter, the metal may be allowed to solidify into a solid ingot, or it may be withdrawn from the reactor in the molten state.

The resulting metal is comparatively free from impurities although it may contain small amounts, for example one or several percent of magnesium, calcium or other reducing metal which has been used to effect the reaction, and it also may be contaminated with the added metal halide or its reaction product. For example, when thorium fluoride and zinc chloride are co-reduced, the resulting product will be a mixture or alloy of thorium and zinc, and similar results are secured when halides of metals other than zinc are used in conjunction in the process herein contemplated. Further impurities may be present due to the use of reactants which are impure, and in addition some thorium or other refractory metal oxide may be present due to partial reaction of the refractory metal with the lining and/or due to the presence of a residual amount of water in the mixture or reactor lining.

As previously stated, a substantial purification of the metal may be secured by heating the metal in vacuo at a temperature at which it is molten. In order to secure a satisfactory purification and prevent further oxidation or contamination of the metal, this treatment is preferably conducted in a closed crucible or melting chamber constructed of graphite or similar inert material, and the absolute pressure established within the crucible is generally below about 1 to 2 millimeters of mercury and frequently of the order of 100 to 200 microns. Impurities such as magnesium, calcium, or other alkaline earth metal, sodium, potassium or other alkali metal, boron, silicon, cadmium, zinc, or other metals, phosphorus, sulphur, and halogens are removed to a very substantial degree by this process. The temperature of melting usually is 100 or 200° above the melting point of the metal undergoing purification treatment but below the boiling point of such metal.

After impurities have been distilled from the molten mass, the molten metal may be drained from the crucible and cast into suitable ingots. A further purification of this metal is thus secured since the nonvolatile impurities including oxides tend to form a scum or film particularly where the temperature of melting is maintained below the melting point of the respective oxide of the metal undergoing treatment. In such a case the oxide remains essentially solid or semisolid and the metal flows from the oxide which in turn tends to adhere to the walls of the crucible or at least to separate substantially from the metal.

The following examples are illustrative.

Example 1

A bomb was prepared by welding a closed end to an iron pipe 6 inches in diameter and 36 inches long and providing a flange on the other end capable of receiving a closing cover. The bomb was provided with a liner by depositing a layer of dry calcined calcium oxide upon the floor of the bomb, centrally disposing a mandrel, pouring calcium oxide in the space around the mandrel and jolting the assembly on a mechanical jolter at a jolting rate of about 200 jolts per minute. The mandrel was recovered, and the following charge was then introduced:

| | Pounds |
|---|---|
| Thorium fluoride | 17.05 |
| Zinc chloride | 3.77 |
| Calcium | 6.65 |

The charge had been weighed and mixed in a dry room, precautions being taken to prevent absorption of an appreciable amount of moisture by the zinc chloride. A layer of dry calcium oxide was packed on top of the charge and the top flange was bolted on. The bomb was inserted in a gas burner furnace leaving the end which had the flanged cover exposed to the atmosphere. The temperature of the furnace was 627° C. and the reaction initiated in 14½ minutes. The top of the reactor was at a temperature several hundred degrees below that of the central portion thereof. Several minutes after the reaction initiated, the bomb was removed from the furnace and cooled with a water spray. The top flange was removed, and an ingot weighing about 13 pounds and having the following analysis was obtained.

| | | |
|---|---|---|
| Th (total) | percent | 91.2 |
| Zn | do | 9.65 |
| C | do | 0.69 |
| B | p. p. m | <0.1 |
| Be | p. p. m | <1.5 |
| Ca | p. p. m | 1710 |
| Cd | p. p. m | 0.88 |
| Mg | p. p. m | 1000 |

The ingot was heated to about 1900° C. in a vacuum at an absolute pressure below about 1 millimeter of mercury. After casting in a beryllium mold, the product contained less than 100 p. p. m. of zinc, no cadmium or boron and only traces of calcium, beryllium, carbon and magnesium.

This process may be conducted using cadmium chloride, bismuth chloride or zinc fluoride etc. in lieu of zinc chloride.

Example 2

The process described in Example 1 was repeated using a sintered calcium oxide crucible in an iron bomb 2½ by 12 inches and using the following charge:

| | Grams |
|---|---|
| Thorium fluoride | 250 |
| Beryllium fluoride | 5 |
| Iodine | 205 |
| Calcium | 121 |

The bomb was heated to 656° C. and the reaction initiated at this temperature. After cooling, a thorium-beryllium alloy which was quite malleable and quite resistant to corrosion was secured in the form of a massive ingot.

Example 3

The process of Example 2 was repeated using the following charge:

| | Grams |
|---|---|
| Thorium fluoride | 500 |
| Beryllium fluoride | 382 |
| Iodine | 415 |
| Calcium | 625 |

A thorium-beryllium alloy was secured containing about 17 percent by weight of beryllium and 83 percent by weight of thorium. The product produced was hard and quite resistant to corrosion.

Example 4

The process of Example 3 was repeated using a mixture of bismuth and thorium fluorides in the proportion of one mole of $ThF_4$ to one-third mole of $BiF_3$ to 3 moles of calcium metal. Thorium-bismuth alloy separated; bismuth was removed therefrom by distillation as in Example 1.

The invention is particularly concerned with and has been described with particular reference to the production of metallic thorium. However the principles herein disclosed may be applied to the production of other "refractory" metals which term is intended to denote metals having melting points of 1600 to 1800° C. or above. For example, fluorides of other high melting metals such as fluorides of hafnium, chromium, titanium, zirconium, tungsten, tantalum or similar metals of the group IV–A, group V–A and group VI–A which melt at 1600–1800° C. or above may be reduced with zinc chloride, cadmium chloride or similar chloride or other halide of a B-group metal as above listed and the metals may be separated by distillation or similar means.

The invention as herein described has been particularly concerned with the production of the metals desired from their fluorides which have the general formula $MF_x$ where M is the metal concerned and $x$ is a small whole number, usually being 2, 3 or 4 depending upon the respective valence of the metal. The use of a fluoride which is highly volatile, as, for instance, $TiF_4$ is not desirable, because of the development of high pressures. In such a case complex less volatile fluorides, such as $Na_2TiF_6$ or $K_2TiF_6$ may be used. The process may be applied to the production of metals from other halides, such as chlorides, bromides or iodides of the above metals. At the same time, however, production of metal from these compounds may be disadvantageous in some cases due to the high pressures which may be developed in the reactor and also due to the hygroscopicity of the chlorides and similar halides. The hygroscopicity of some of these halides is particularly objectionable because the water contaminant thus introduced in the reaction materially reduces the yield of metal secured and makes the separation of the molten phases more difficult. In consequence it is preferred to conduct the reactions herein contemplated using the fluoride. However, mixtures of fluoride and chloride may be used as previously described, and in such a case increased fluidity in the slag permits a better recovery of the metals produced. Similar results may be secured by using other chloride-fluoride mixtures or other mixtures of metal fluorides with other halides of the metal. For example, a mixture of $ThF_4$ and $ThCl_4$, $ThBr_4$ or $ThI_4$ may be co-reduced. Likewise, a mixture of $ThCl_4$ and $ZnF_2$ may beduced as herein contemplated. Moreover, halides of chromium, zirconium etc. such as chromic chloride, chromic fluoride, or other of the refractory metal halides may be reduced by this process. Where the simple halides are undesirable because of their high volatility, less volatile halides such as $Na_2TiF_6$, $K_2TiF_6$ or $Na_2ZrF_6$ may be reduced in the present process.

While the invention is particularly concerned with the reduction of halides of refractory metals above defined, it may be advantageously applied to the reduction of metal halides generally. Thus the co-reduction by means of a metal higher in the electromotive series mixed of a fluoride of a metal lower in the series with another halide of the same or different metal, such as the chloride thereof, is advantageous to form a more fluid and/or lower-melting slag which separates more readily from the molten metal formed. For example, beryllium fluoride may be co-reduced with lead chloride, zinc chloride or cadmium chloride by calcium or similar metal as herein contemplated.

The following example illustrates such a process.

*Example 5*

An iron bomb 3 inches in diameter and 22 inches long and lined with a tamped, calcined calcium oxide liner about ¼ inch thick was charged with the following usual precaution to prevent absorption of moisture by the anhydrous reactants.

| | Grams |
|---|---|
| $BeF_2$ | 1000 |
| $PbCl_2$ | 1200 |
| Calcium metal | 1040 |

A graphite cover was placed over the charge, the bomb was sealed and placed in a furnace chamber heated to about 680° C. After 33 minutes reaction took place, and several minutes later the bomb was removed and allowed to cool. In this process the metallic lead settled to the bottom and metallic beryllium containing little lead rose to the top with the slag collecting between the two layers.

Although the present invention has been described with particular reference to the specific details of certain embodiments thereof it is not intended that such details shall be regarded as limitations upon the scope of the invention except insofar as included in the accompanying claim.

What is claimed is:

A method of preparing metallic thorium in compact form, consisting of mixing thorium fluoride, zinc chloride, and a reducing agent selected from the group consisting of alkali metals and alkaline earth metals; heating at least a portion of the mixture obtained to about from 400° to 600° C. to initiate reduction of thorium fluoride and said zinc chloride; completing said reduction reactions while maintaining the reaction mixture under superatmospheric pressure, whereby a coherent metallic phase and a separate slag phase form; separating said two phases; and heating the metal obtained to about from 1900° to 2050° C. in vacuo whereby zinc is distilled from the thorium.

References Cited in the file of this patent

UNITED STATES PATENTS

| 1,437,984 | Marden | Dec. 5, 1922 |
| 1,659,209 | Marden | Feb. 14, 1928 |
| 1,728,940 | Marden | Sept. 24, 1929 |
| 1,740,857 | Kroll | Dec. 24, 1929 |
| 2,376,582 | Dean | May 22, 1945 |

FOREIGN PATENTS

| 230,865 | Great Britain | Dec. 10, 1925 |